US012368233B2

(12) United States Patent
Huang et al.

(10) Patent No.: US 12,368,233 B2
(45) Date of Patent: Jul. 22, 2025

(54) BASE STATION ANTENNA WITH MUTUAL DOWNTILT IN MULTIPLE FREQUENCY BANDS

(71) Applicant: Outdoor Wireless Networks LLC, Claremont, NC (US)

(72) Inventors: Joy Huang, Plano, TX (US); Rui An, Allen, TX (US); Satej Tirodkar, Goa (IN)

(73) Assignee: Outdoor Wireless Networks LLC, Richardson, TX (US)

( * ) Notice: Subject to any disclaimer, the term of this patent is extended or adjusted under 35 U.S.C. 154(b) by 468 days.

(21) Appl. No.: 18/050,529

(22) Filed: Oct. 28, 2022

(65) Prior Publication Data

US 2023/0170605 A1 Jun. 1, 2023

Related U.S. Application Data

(60) Provisional application No. 63/264,616, filed on Nov. 29, 2021.

(51) Int. Cl.
*H01Q 1/24* (2006.01)
*H01Q 3/18* (2006.01)
(Continued)

(52) U.S. Cl.
CPC ............... *H01Q 1/246* (2013.01); *H01Q 3/18* (2013.01); *H01Q 3/32* (2013.01); *H01Q 19/18* (2013.01)

(58) Field of Classification Search
CPC H01Q 1/246; H01Q 3/18; H01Q 3/32; H01Q 19/18; H01Q 3/26; H01Q 15/14;
(Continued)

(56) References Cited

U.S. PATENT DOCUMENTS 7,907,096 B2 3/2011 Timofeev et al.
2017/0170549 A1* 6/2017 Buondelmonte .. H01Q 21/0075
(Continued)

*Primary Examiner* — Dinh Nguyen
(74) *Attorney, Agent, or Firm* — Myers Bigel, P.A.

(57) ABSTRACT

A base station antenna includes: a plurality of reflector panels; a plurality of printed circuit boards (PCBs), each of the circuit boards mounted on a respective one of the reflector panels; a plurality of radiating elements mounted on each of the PCBs, wherein the PCBs and the radiating elements are configured and arranged so that the base station antenna receives and transmits radio frequency signals in a first frequency band and a second frequency band; first and second wiper members pivotally mounted on each PCB at respective first and second pivots, the first and second wiper members being configured such that pivotal movement of the first and second wiper members induce downtilt angle adjustment in the radiating elements that transmit and receive signals in first frequency band; third and fourth wiper members pivotally mounted on each PCB at respective third and fourth pivots, the third and fourth wiper members being configured such that pivotal movement of the third and fourth wiper members induce downtilt angle adjustment in the radiating elements that transmit and receive signals in a second frequency band; and a phase shifter linkage comprising a first carrier member and a second carrier member fixed relative to the first carrier member, the first carrier member engaging the first and second wiper members and the second carrier member engaging the third and fourth wiper members. Actuation of the phase shifter linkage causes the first carrier member and the second carrier member to move in concert relative to the PCBs, so that downtilt angle adjustment of the first frequency band equals downtilt adjustment of the second frequency band.

18 Claims, 8 Drawing Sheets

(51) Int. Cl.
*H01Q 3/32* (2006.01)
*H01Q 19/18* (2006.01)

(58) Field of Classification Search
CPC .......... H01Q 3/005; H01Q 3/06; H01Q 21/08; H01Q 21/26; H01Q 1/38; H01Q 3/02; H01Q 3/34; H01Q 5/20; H01Q 19/10
See application file for complete search history.

(56) References Cited

U.S. PATENT DOCUMENTS

2019/0326663 A1* 10/2019 Liu ........................ H01Q 1/246
2020/0243951 A1 7/2020 Liu et al.

* cited by examiner

BASE STATION ANTENNA WITH MUTUAL DOWNTILT IN MULTIPLE FREQUENCY BANDS

RELATED APPLICATION

The present application claims priority from and the benefit of U.S. Provisional Patent Application No. 63/264,616, filed Nov. 29, 2021, the disclosure of which is hereby incorporated herein by reference in full.

FIELD OF THE INVENTION

The present disclosure relates to base station antennas of communication systems and, in particular, to base station antennas having adjustable downtilt capability.

BACKGROUND OF THE INVENTION

The information in this section merely provides background information related to the present disclosure and may not constitute prior art(s) for the present disclosure.

Cellular communications systems are used to provide wireless communications to fixed and mobile subscribers (herein "users"). A cellular communications system may include a plurality of base stations that each provide wireless cellular service for a specified coverage area that is typically referred to as a "cell." Each base station may include one or more base station antennas that are used to transmit radio frequency ("RF") signals to, and receive RF signals from, the users that are within the cell served by the base station. Base station antennas are directional devices that can concentrate the RF energy that is transmitted in certain directions (or received from those directions). The "gain" of a base station antenna in a given direction is a measure of the ability of the antenna to concentrate the RF energy in that particular direction. The "radiation pattern" of a base station antenna is compilation of the gain of the antenna across all different directions. The radiation pattern of a base station antenna is typically designed to service a pre-defined coverage area such as the cell or a portion thereof that is typically referred to as a "sector." The base station antenna may be designed to have maximum gain levels throughout its pre-defined coverage area, and it is typically desirable that the base station antenna have much lower gain levels outside of the coverage area to reduce interference between sectors/cells. Early base station antennas typically had a fixed radiation pattern, meaning that once a base station antenna was installed, its radiation pattern could not be changed unless a technician physically reconfigured the antenna. Unfortunately, such manual reconfiguration of the base station antennas after deployment, which could become necessary due to changed environmental conditions or the installation of additional base stations, was typically difficult, expensive and time-consuming.

Base station antennas typically comprise a linear array or a two-dimensional array of radiating elements such as patch, dipole or crossed dipole radiating elements. In order to electronically change the downtilt angle of these antennas, a phase taper may be applied across the radiating elements of the array, as is well understood by those of skill in the art. Such a phase taper may be applied by adjusting the settings on an adjustable phase shifter that is positioned along the RF transmission path between a radio and the individual radiating elements of the base station antenna. One widely used type of phase shifter is an electromechanical "wiper" phase shifter that includes a main printed circuit board and a "wiper" printed circuit board that may be rotated above the main printed circuit board. Such wiper phase shifters typically divide an input RF signal that is received at the main printed circuit board into a plurality of sub-components, and then capacitively couple at least some of these sub-components to the wiper printed circuit board. The sub-components of the RF signal may be capacitively coupled from the wiper printed circuit board back to the main printed circuit board along a plurality of arc-shaped traces, where each arc has a different diameter. Each end of each arc-shaped trace may be connected to a radiating element or to a sub-group of radiating elements. By physically (mechanically) rotating the wiper printed circuit board above the main printed circuit board, the locations where the sub-components of the RF signal capacitively couple back to the main printed circuit board may be changed, which thus changes the length of the respective transmission paths from the phase shifter to an associated radiating element for each sub-component of the RF signal. The changes in these path lengths result in changes in the phases of the respective sub-components of the RF signal, and since the arcs have different radii, the phase changes along the different paths will be different. Thus, the above-described wiper phase shifters may be used to apply a phase taper to the sub-components of an RF signal that are applied to each radiating element (or sub-group of radiating elements). Exemplary phase shifters of this variety are discussed in U.S. Pat. No. 7,907,096 to Timofeev, the disclosure of which is hereby incorporated herein in its entirety.

The wiper printed circuit board is typically moved using an actuator that is connected to the wiper printed circuit board via a mechanical linkage. The mechanical linkages may be manually or motor-driven or, in some case driven from a remote location via an electronic signal (there are known as Remote Electrical Tilt devices or "RET"). Particularly as the size of antennas becomes smaller (e.g., in small cell and "metrocell" applications in urban areas), space within the antenna may be at a premium. Thus, it may be desirable to provide designs for phase shifter actuators and/or linkages that may save space within the antenna housing while still delivering acceptable performance.

SUMMARY OF THE INVENTION

As a first aspect, embodiments of the invention are directed to a base station antenna. The base station antenna comprises: a plurality of reflector panels; a plurality of printed circuit boards (PCBs), each of the circuit boards mounted on a respective one of the reflector panels; a plurality of radiating elements mounted on each of the PCBs, wherein the PCBs and the radiating elements are configured and arranged so that the base station antenna receives and transmits radio frequency signals in a first frequency band and a second frequency band; first and second wiper members pivotally mounted on each PCB at respective first and second pivots, the first and second wiper members being configured such that pivotal movement of the first and second wiper members induce downtilt angle adjustment in the radiating elements that transmit and receive signals in the first frequency band; third and fourth wiper members pivotally mounted on each PCB at respective third and fourth pivots, the third and fourth wiper members being configured such that pivotal movement of the third and fourth wiper members induce downtilt angle adjustment in the radiating elements that transmit and receive signals in the second frequency band; and a phase shifter linkage comprising a first carrier member and a second carrier member fixed relative to the first carrier member, the first carrier member engaging the first and second wiper members and the second carrier member engaging the third and fourth wiper members. Actuation of the phase shifter linkage causes the first carrier member and the second carrier member to move in concert relative to the PCBs, so that downtilt angle adjustment of the first frequency band equals downtilt adjustment of the second frequency band.

As a second aspect, embodiments of the invention are directed to a base station antenna comprising: a plurality of reflector panels; a plurality of printed circuit boards (PCBs), each of the circuit boards mounted on a respective one of the reflector panels; a plurality of radiating elements mounted on each of the PCBs, wherein the PCBs and the radiating elements are configured and arranged so that the base station antenna receives and transmits radio frequency signals in a first frequency band and a second frequency band; first and second wiper members pivotally mounted on each PCB at respective first and second pivots, the first and second wiper members being configured such that pivotal movement of the first and second wiper members induce downtilt angle adjustment in antenna beams produced by the radiating elements that transmit and receive signals in a first frequency band; third and fourth wiper members pivotally mounted on each PCB at respective third and fourth pivots, the third and fourth wiper members being configured such that pivotal movement of the third and fourth wiper members induces downtilt angle adjustment in antenna beams produced by the radiating elements that transmit and receive signals in a second frequency band; and a phase shifter linkage comprising a first carrier member and a second carrier, the first carrier member engaging the first and second wiper members and the second carrier member engaging the third and fourth wiper members, the phase shifter linkage configured to move the first and second carrier members along an axis. The first and second pivots are not axially offset from each other, and wherein the third and fourth pivots are axially offset from each other.

As a third aspect, embodiments of the invention are directed to a base station antenna comprising: four reflector panels; four printed circuit boards (PCBs), each of the circuit boards mounted on a respective one of the reflector panels; a plurality of radiating elements mounted on each of the PCBs, wherein the PCBs and the radiating elements are configured and arranged so that the base station antenna receives and transmits radio frequency signals in a first frequency band and a second frequency band; first and second wiper members pivotally mounted on each PCB at respective first and second pivots, the first and second wiper members being configured such that pivotal movement of the first and second wiper members induce downtilt angle adjustment in antenna beams produced by the radiating elements that transmit and receive signals in first frequency band, the first frequency band being the S-frequency band; third and fourth wiper members pivotally mounted on each PCB at respective third and fourth pivots, the third and fourth wiper members being configured such that pivotal movement of the third and fourth wiper members induce downtilt angle adjustment in antenna beams produced by the radiating elements that transmit and receive signals in a second frequency band, the second frequency band being the V-frequency band; and a phase shifter linkage comprising a first carrier member and a second carrier member fixed relative to the first carrier member, the first carrier member engaging the first and second wiper members and the second carrier member engaging the third and fourth wiper members. Actuation of the phase shifter linkage causes the first carrier member and the second carrier member to move in concert relative to the PCBs, so that downtilt angle adjustment of the first frequency band equals downtilt adjustment of the second frequency band.

DETAILED DESCRIPTION OF THE INVENTION

Figure 1:
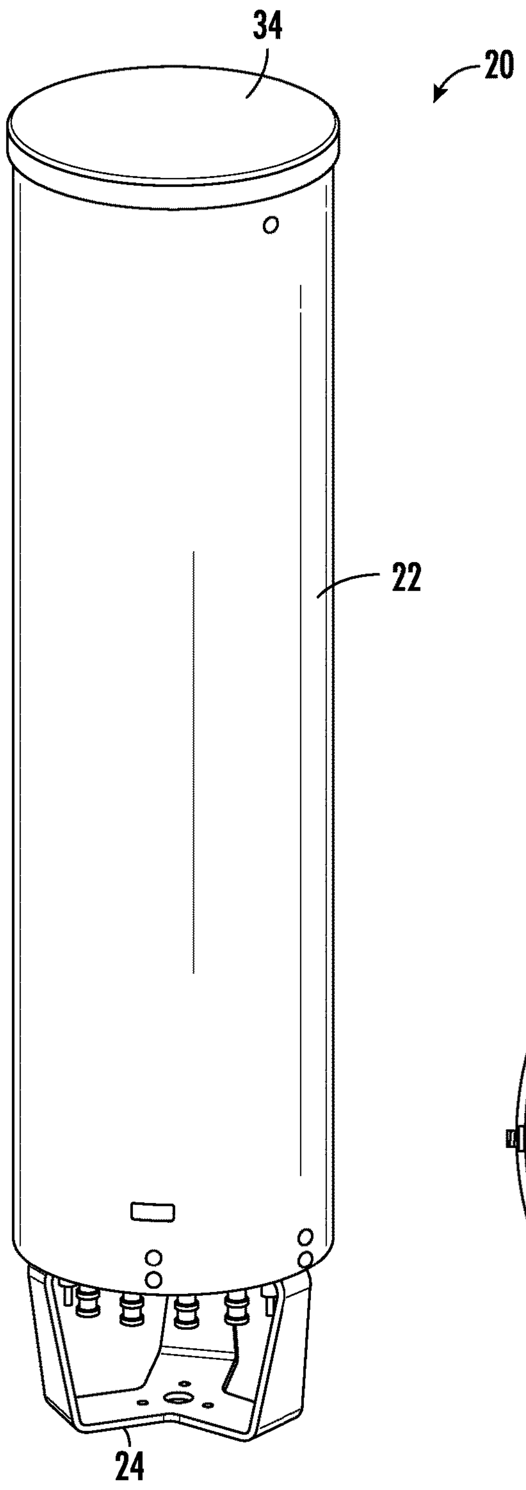
FIG. 1 is a perspective view of a cellular base station antenna according to embodiments of the invention.

The present invention is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

It will also be understood that, as used herein, the terms "example," "exemplary," and derivatives thereof are intended to refer to non-limiting examples and/or variants embodiments discussed herein, and are not intended to indicate preference for one or more embodiments discussed herein compared to one or more other embodiments.

Figure 3:
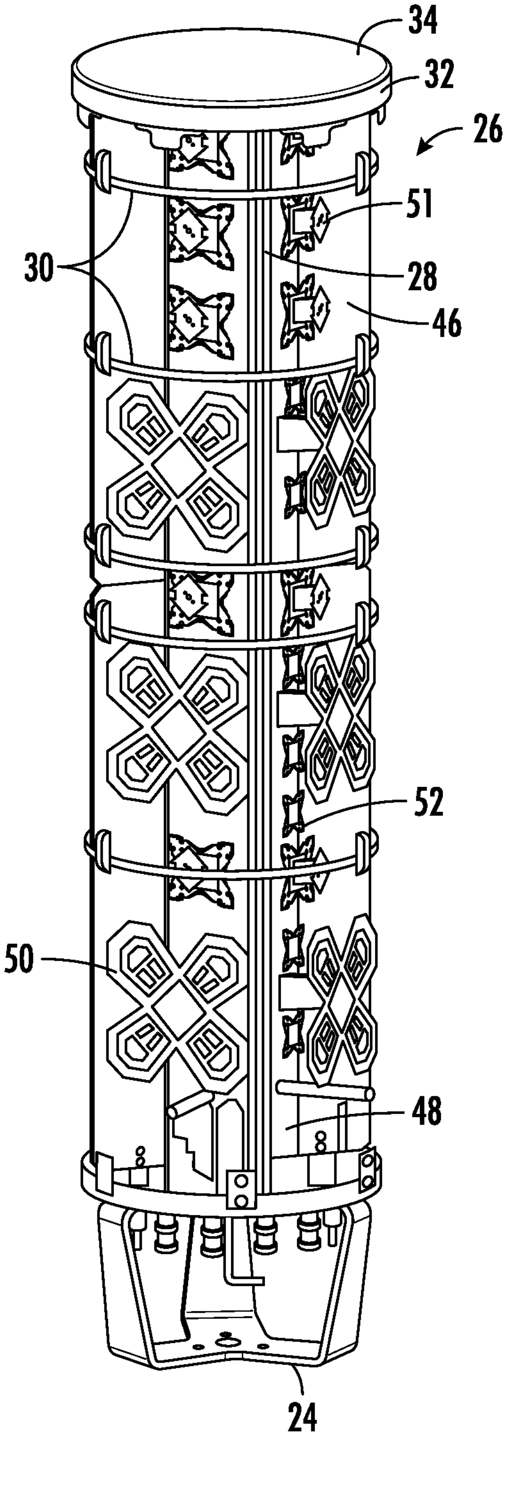
FIG. 3 is a perspective view of the antenna of FIG. 1 with the housing removed.

Referring now to the drawings, an antenna for a cellular base station, designated broadly at 20, is shown in FIG. 1. The antenna 20 is generally cylindrical and is surrounded by a housing 22 that may include a radome 22. As can be seen in FIGS. 1 and 3, the antenna 20 includes a three-pronged bracket 24 for mounting the antenna 20 from underneath. A frame 26 includes rails 28 that are mounted to annular supports 30 (typically each support 30 comprises four quarter sections). An upper plate 32 is mounted to the upper ends of the rails 28 (FIG. 4) and is covered by an end cap 34 (FIG. 3). A lower plate 36 is mounted to the lower ends of the rails 28 and to the prongs of the bracket 24.

Those of skill in this art will recognize that the frame 26 may take many forms suitable for supporting the housing 22 and the internal components of the antenna 20 described below.

Figure 2:
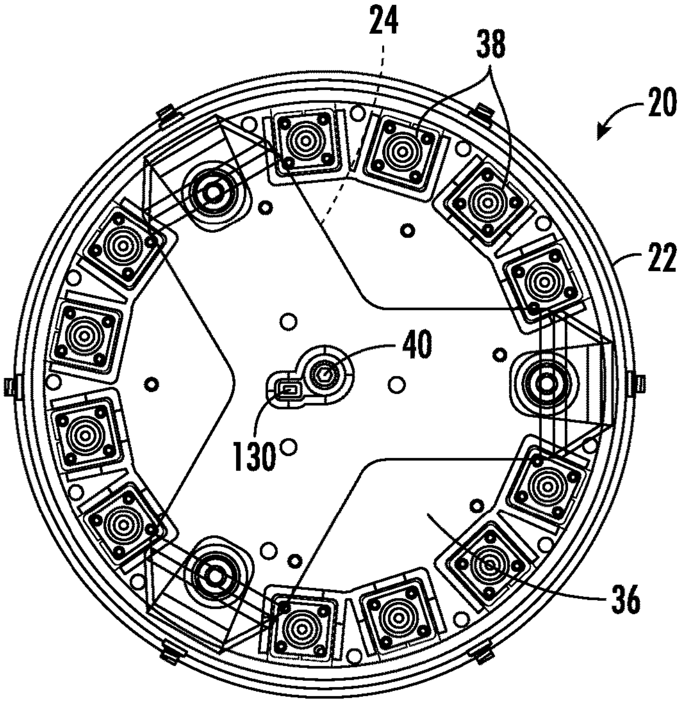
FIG. 2 is a bottom view of the antenna of FIG. 1.

Referring now to FIG. 2, the underside of the lower plate 36 is shown therein. The lower plate 36 includes twelve ports 38 about its periphery that supply power and signals to the internal components of the antenna 20. A projection 40 is located at the center of the lower plate 36 and extends downwardly therefrom. The projection 40 is connected with the drive linkage 102 (described in greater detail below) and is rotatable about a vertical axis relative to the lower plate 36; the projection 40 may have a configuration suitable for facilitating rotation with a tool (e.g., it may have a hex-head or the like).

Figure 4:
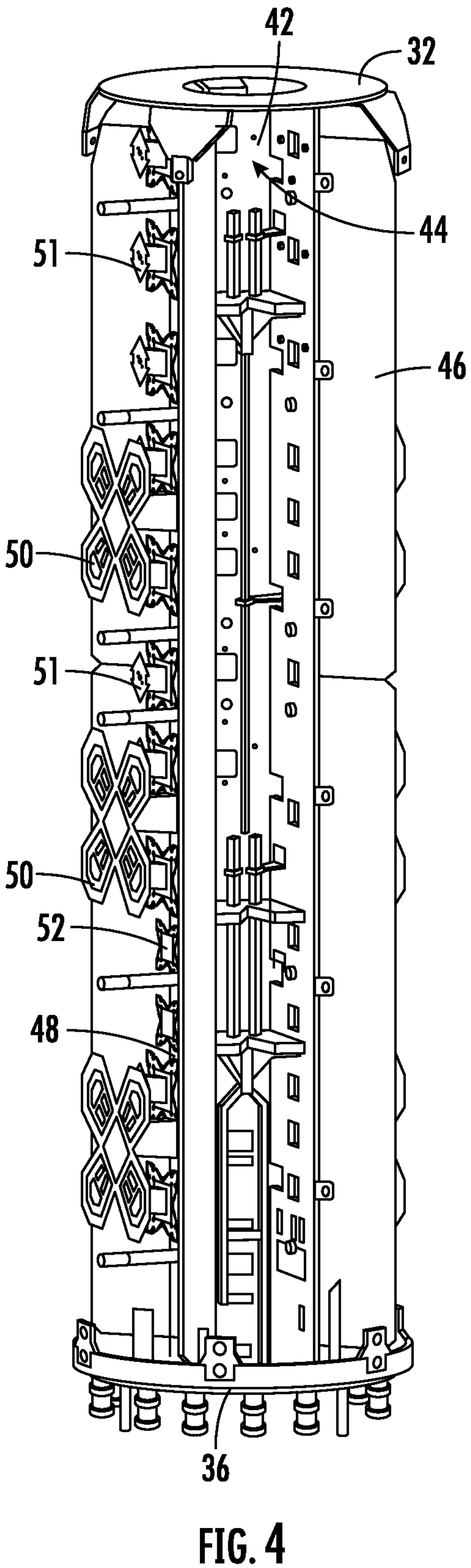
FIG. 4 is a perspective view of the antenna of FIG. 1 with the housing and one reflector panel removed.
Figure 5:
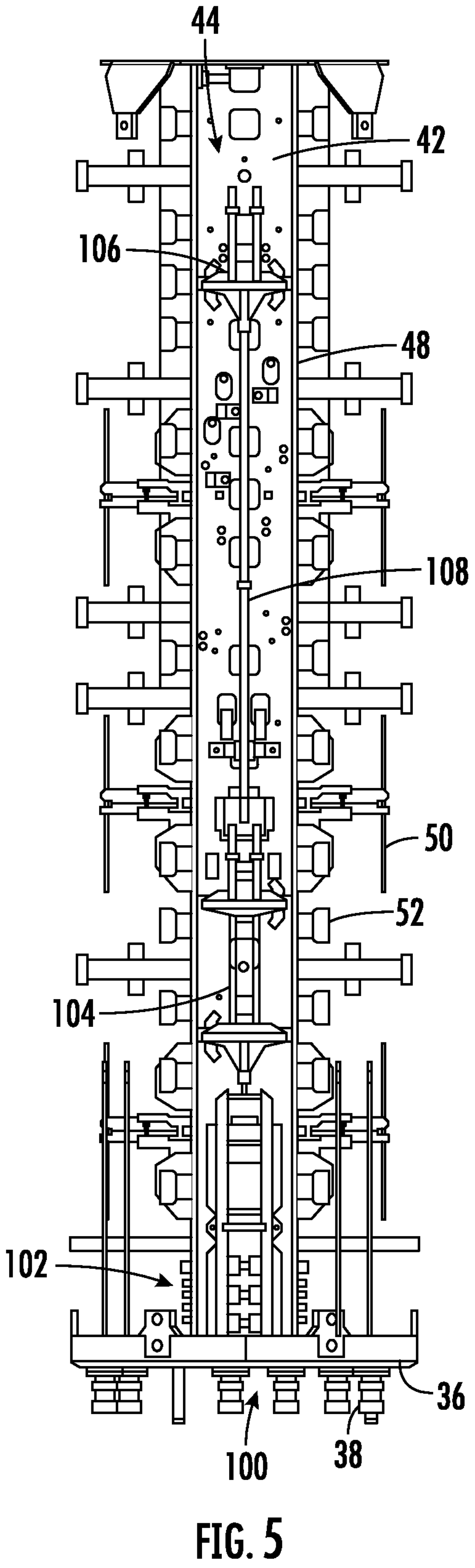
FIG. 5 is a front view of the antenna of FIG. 1 with the housing and one reflector panel removed to show the phase shifter linkage.
Figure 8:
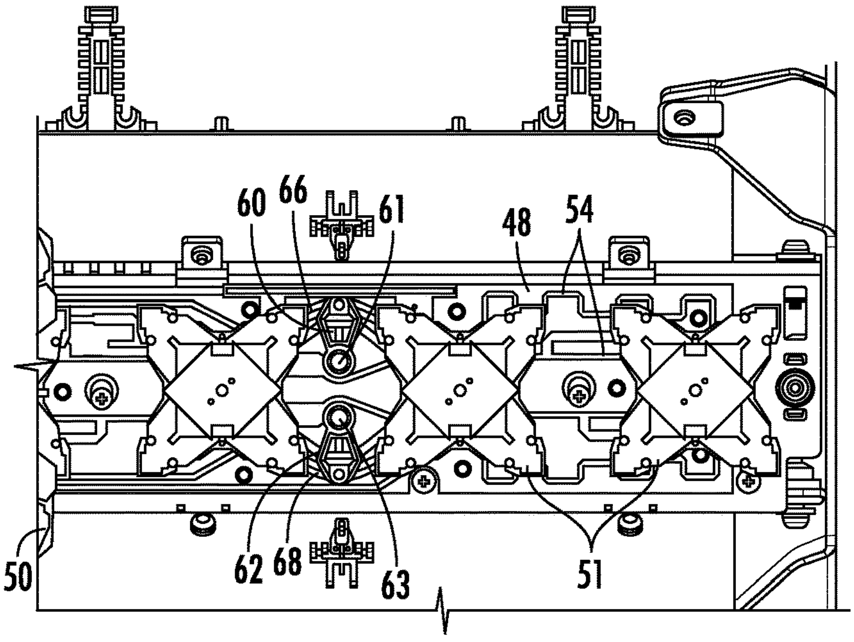
FIG. 8 is a side view of one set of V-band radiating elements and two wiping members of the phase shifter linkage employed to adjust tilt on the V-band radiating elements.
Figure 10:
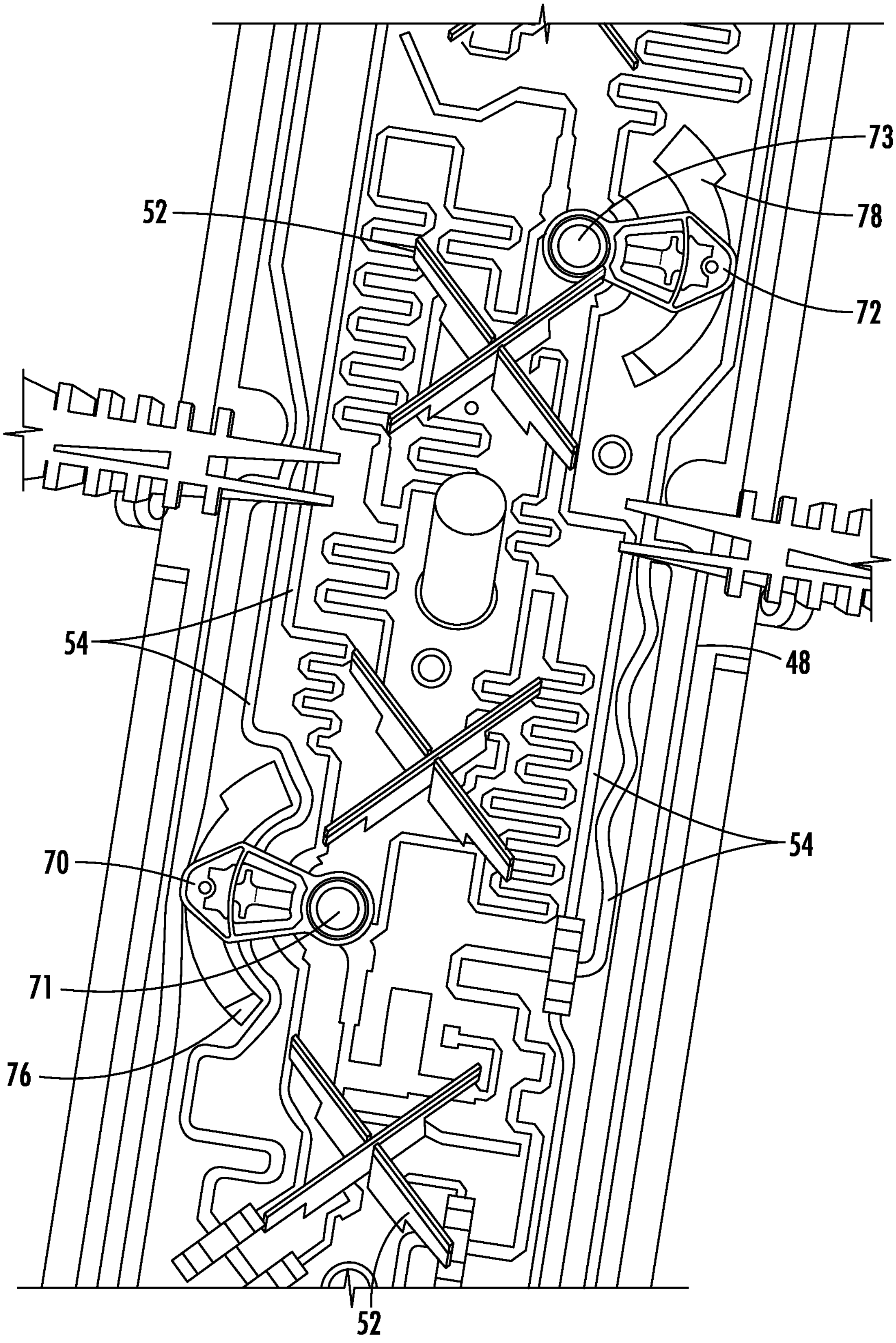
FIG. 10 is a side view of one set of S-band radiating elements and the wiping members of the phase shifter employed to adjust tilt on the S-band radiating elements.
Figure 11A:
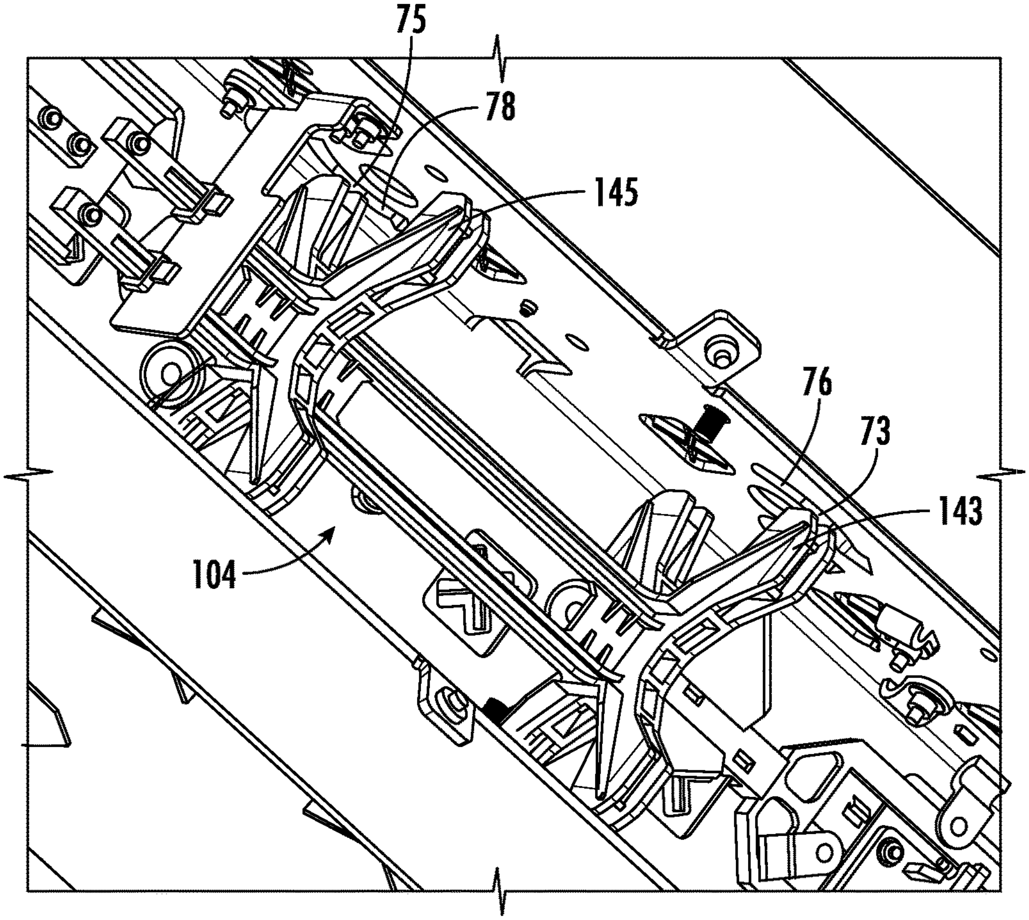
FIG. 11A is a side perspective view of the S-band carrier member of the phase shifter linkage shown within the reflector panels.
Figure 11B:
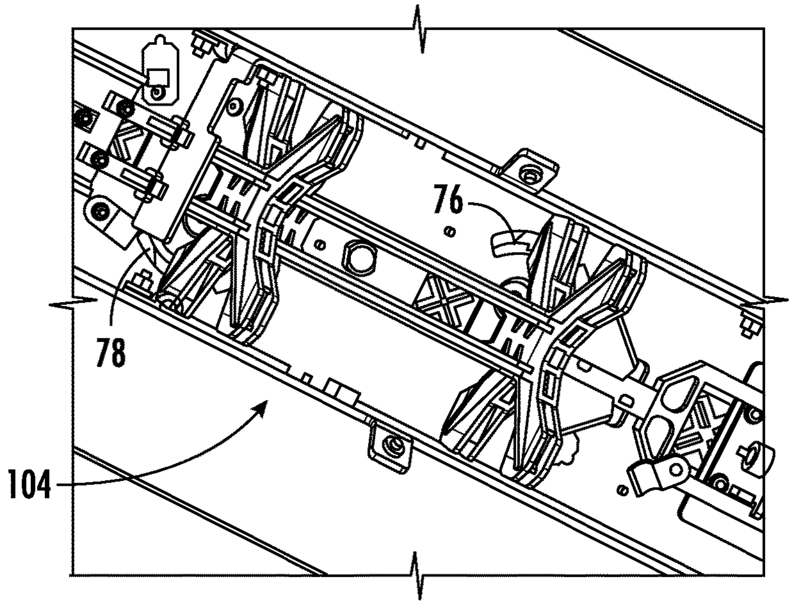
FIG. 11B is an opposite side perspective view of the S-band carrier member of the phase shifter linkage shown within the reflector panels.

Referring now to FIGS. 4 and 5, the antenna 20 includes an assembly of reflector panels 42. The reflector panels 42 form an elongate, hollow enclosure 44 with a rectangular (e.g., square) cross-section. Divider panels 46 extend radially outwardly from each corner of the enclosure 44. A printed circuit board (PCB) 48 is mounted on the outward surface of each of the reflector panels (see also FIG. 6). Radiating elements of different types are mounted to the PCBs 48; for example, a PCB 48 may include one or more large radiating elements 50, one or more medium radiating elements 51, and one or more small radiating elements 52 (see FIGS. 3, 4, 8 and 10). Traces 54 on the PCBs 48 connect the radiating elements 50, 51, 52 with power and signal circuits to provide transceiving capability to the antenna 20 (traces 54 are best seen in FIGS. 8 and 10). Ordinarily, the PCBs 48 are substantially the same, as are the selection and arrangements of the radiating elements 50, 51, 52 on the PCBs 48.

The structure and function of the radiating elements 50, 51, 52 mounted on the PCBs 48 as they overlie the reflector panels 42 are described in greater detail in U.S. Patent Publication No. 2020/0243951 to Liu et al., the disclosure of which is hereby incorporated herein by reference in full. Those skilled in this art will also recognize that other radiation elements may be use either in addition to or instead of the illustrated radiation elements 50, 51, 52. Also, the structure and function of the traces 54 on the PCB 48 are well-understood and need not be described in detail herein.

The radiating elements 50, 51, 52 and traces 54 may be configured and arranged to transmit and receive at different frequency "bands." In the illustrated embodiment, the radiating elements 52 and traces 54 are arranged to transmit and receive RF signals at a frequency of between about 3.1 to 4.2 GHz, which is also known as the "S-band." The radiating elements 51 and traces 54 may be arranged to transmit and receive RF signals at a frequency of between about 1.695 and 2.690 GHz, which is also known as the "V-band." The radiating elements 50 and traces 54 are configured to transmit at a frequency of between about 696-960 MHz (known as the R-band). These frequency bands are well-known to those of skill in this art and need not be described in detail herein.

Referring now to FIGS. 8 and 10, each of the PCBs 48 has mounted on it four wiper members. Wiper members 60, 62 (FIG. 8) are pivotally mounted at pivots 61, 63 to an upper section of the PCB 48 at essentially the same elevation. Notably, the PCB 48 includes two arcuate slots 66, 68, wherein a portion of one of the wiper members 60, 62 overlies a respective one of the slots 66, 68. In addition, wiper members 70, 72 (FIG. 10) are pivotally mounted at pivots 71, 73 to a lower section of the PCB 48, each of which partially overlies a respective arcuate slot 76, 78. However, the wiper members 70, 72 are offset vertically from each other (rather than being mounted at essentially the same elevation); correspondingly, the slots 76, 78 are similarly vertically offset. Each of the wiper members 60, 62, 70, 72 includes a small PCB (not shown) as discussed above that moves with the wiper member 60, 62, 70, 72 as it rotates relative to the PCB 48, which can change the RF signal path length to the radiating elements 51, 52 and, as a result, adjust the downtilt of antenna beams produced by the radiating elements 51, 52 (in the illustrated embodiment, the radiating elements 50, which transmit in the R-band, do not have electrical downtilt adjustment.).

Referring now to FIG. 5, a phase shifter linkage, designated broadly at 100, is shown therein. As can be seen in FIG. 5, the phase shifter linkage 100 is largely contained within the cavity of the enclosure 44 formed by the reflector panels 42. The phase shifter linkage 100 includes a drive linkage 102, an S-band carrier member 104, a V-band carrier member 106, and a connecting rod 108. These components are described in greater detail below.

The drive linkage 102 (FIG. 7) is of conventional design, and includes a foundation plate 110, two bearing plates 112, 114, and a drive screw 116 mounted in the bearing plates 112, 114. The projection 40 discussed above is attached to and rotatable with the drive screw 116. The drive screw 116 extends through a threaded nut 118 that is mounted on a cross-member 120. Two rails 122 extend upwardly from the cross-member 120 to a trapezoidal termination block 124. Two additional cross-members 126, 128 extend between the rails 122. As such, the cross-members 120, 126, 128, the rails 122, and the termination block 124 form a rigid frame 131. An indicator member 130 is attached to one of the rails 122 and extends downwardly through the lower plate 36. The indicator member 130 includes markings 132 at its lower end.

Figure 6:
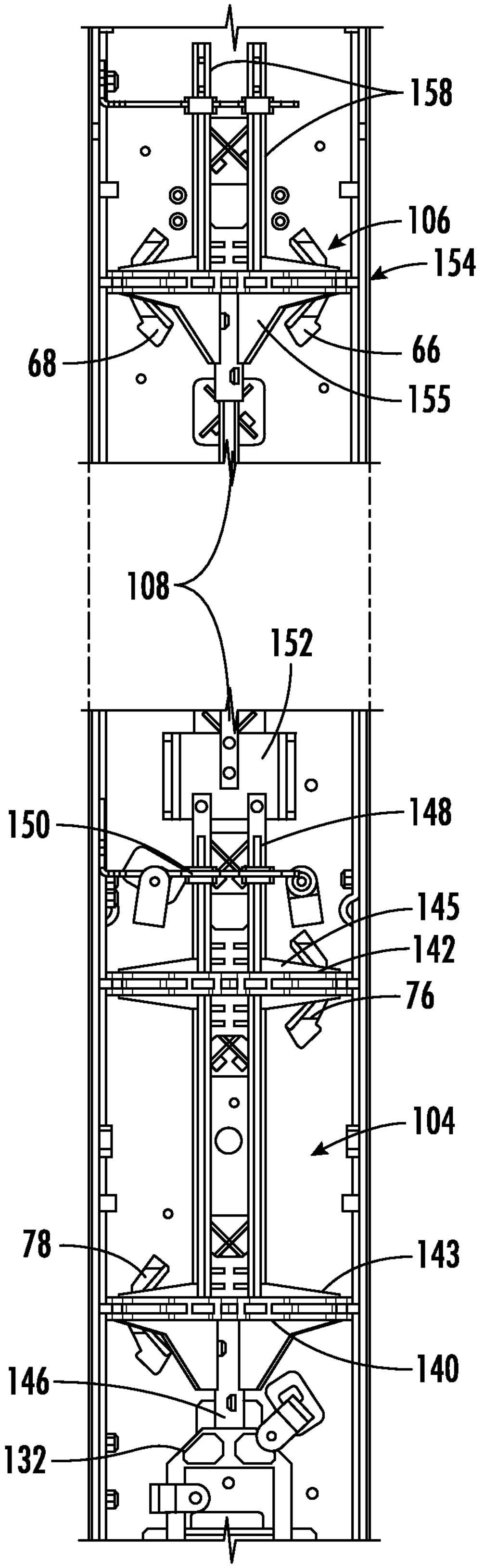
FIG. 6 is a broken partial front view of the phase shifter linkage shown in FIG. 5.
Figure 9:
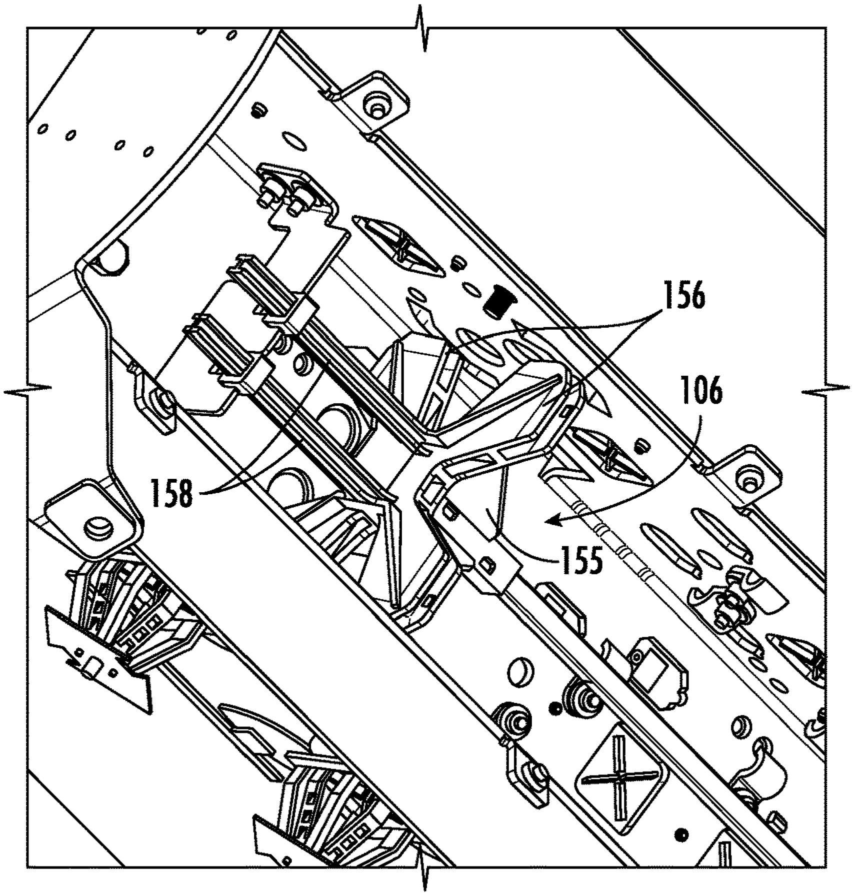
FIG. 9 is a side perspective view of the V-band carrier member of the phase shifter linkage shown within the reflector panels.

Referring now to FIGS. 5, 6 and 9, the V-band carrier member 106 has a single cruciform-shaped section 154 with arms 156. Gussets 155 support the arms 154. Two rods 158 extend upwardly from the section 154 to and through an alignment plate 160.

Figure 9A:
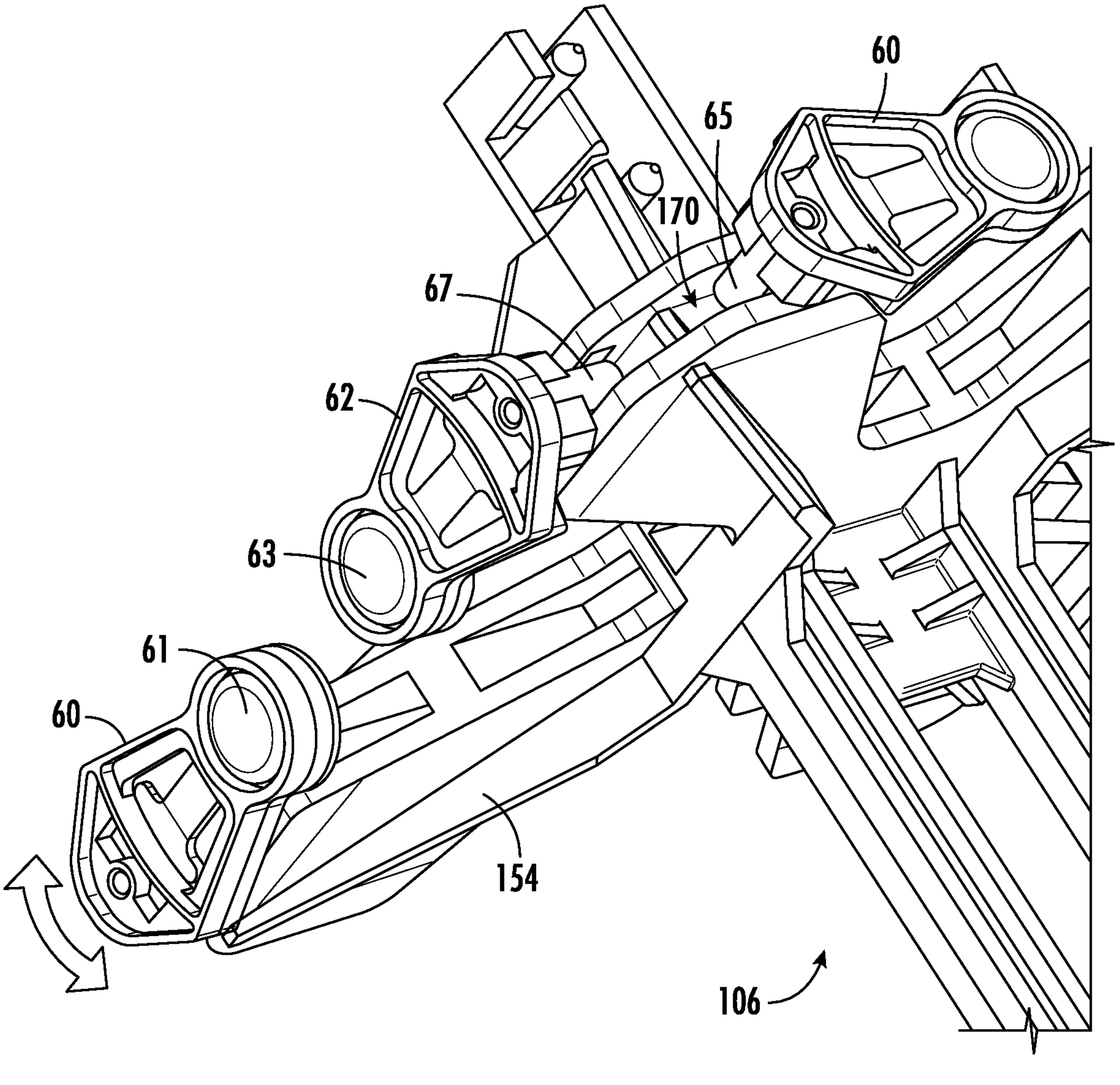
FIG. 9A is a greatly enlarged partial perspective view of the V-band carrier member with the reflector panels and printed circuit boards (PCBs) removed to show the interaction between the wiper members and the arms of the V-band carrier member.

Interaction between the V-band carrier member 106 and the wiper members 60, 62 can be understood with reference to FIG. 9A. As shown therein, each of the arms 154 has a groove 170 in its end portion. Also, each of the wiper members 60, 62 has a pin 65, 67 that extends through a respective slot 66, 68 in the PCB 48 (which is not shown in FIG. 9A) and is received in the groove 170 in the arm 154. FIG. 9A shows that each arm 154 interacts with a wiper member 60 mounted to a first PCB 48 and with a wiper member 62 mounted to a second, adjacent PCB 48 that is oriented 90 degrees to the first PCB 48. Thus, it can be envisioned that, as the V-band carrier member 106 moves vertically, the engagement of the pins 63, 65 in the groove 170 causes the wiper members 60, 62 to pivot relative to the PCBs 48. Such pivoting causes a change in the RF signal path length to the radiating elements 51 and, as a result, adjusts the downtilt of antenna beams produced by the radiating elements 51 as discussed above.

Referring now to FIGS. 5, 6, 11A and 11B, the S-band carrier member 104 includes two generally cruciform-shaped wiper sections 140, 142 connected by rods 144. Each of the wiper sections 140, 142 includes four arms 143, 145, respectively. The wiper section 140 is mounted to the termination block 132 of the drive linkage 102 via an extension post 146. Gussets 147 support the arms 143. Two rods 148 extend upwardly from the wiper section 142 and through an alignment plate 150 to a transition panel 152. The connecting rod 108 extends upwardly from the transition panel 152 to the S-band carrier member 106.

Interaction between the S-band carrier member 104 and the wiper members 70, 72 is similar to that described above for the V-band carrier member 106 and the wiper members 60, 62, in that the wiper members 70, 72 have pins 73, 75 that are received in and extend through slots 76, 78 in the PCB 48. However, because the wiper members 70, 72 and slots 76, 78 are vertically offset from each other, each of the arms 143 of the S-band carrier member 104 engages only one wiper member 70, and each of the arms 145 also engages only one wiper member 72. Nonetheless, vertical movement of the S-band carrier member 104 causes both wiper members 70, 72 to pivot relative to the PCB 48, and to pivot to the same degree, thereby providing antenna beams produced by the radiating elements 52 with the same magnitude of downtilt.

Figure 7:
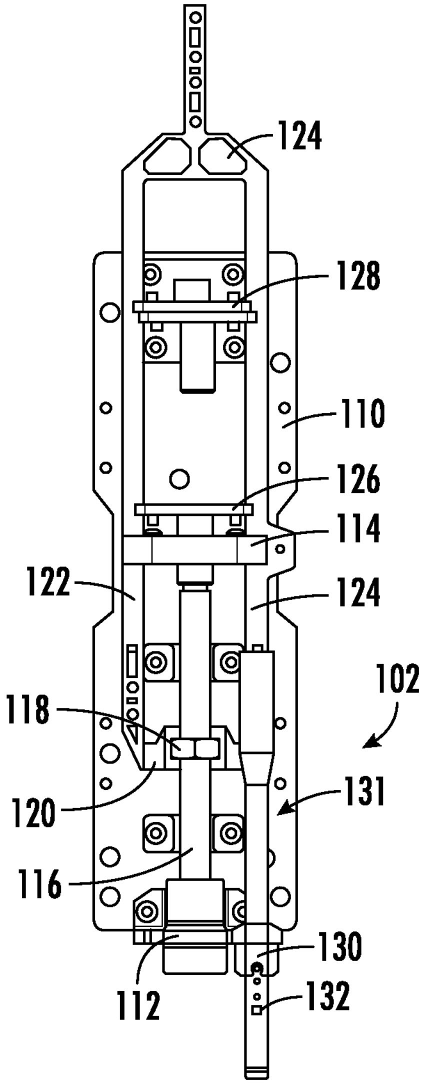
FIG. 7 is a front view of the drive linkage employed to drive the phase shifter linkage of FIG. 6.

As can be envisioned from examination of FIGS. 5-7, adjustment of the downtilt angle of the radiating elements 51, 52 is affected by a technician using a tool (such as a hex wrench or the like) to rotate the projection 40. Such rotation causes the drive screw 116 to rotate about its longitudinal axis. Because the nut 118 is fixed relative to the cross-member 120, rotation of the drive screw 116 forces the nut 118 and, in turn, the entire rigid frame 131 to move parallel to the axis of the drive screw 116 (i.e., vertically in the illustrated embodiment), wherein the direction of vertical movement (i.e., up or down) is dependent on the direction of rotation.

Vertical movement of the rigid frame 131 forces the S-band carrier member 104 to move vertically also. As the arms 143, 145 of the S-band carrier member 104 move, they induce pivotal movement of the wiper members 70, 72, thereby causing the downtilt angle of antenna beams produced by the radiating elements 52 to be adjusted.

Also, the attachment of the connecting rod 108 to the S-band carrier member 104 and the V-band carrier member 106 causes the V-band carrier member 106 to move vertically. Movement of the V-band carrier member 106 induces the wiper members 60, 62 to pivot, thereby adjusting the downtilt angle of the radiating elements 51. Notably, the radiating elements 51, 52, the traces 54, and the wiper members 60, 62, 70, 72 are configured so that, with the magnitude of the vertical movement of the V-band carrier member 106 being the same as the magnitude of the vertical movement of the S-band carrier member 104, the degree of downtilt adjustment is the same for antenna beams produced by the radiating elements 52 in the S-band and the radiating elements 51 of the V-band.

It should also be noted that, as the lead screw 116 is rotated and moves the frame 131 vertically, the indicator member 130 also moves vertically in concert. As the indicator member 130 moves, the markings 132 on the indicator member 132 move relative to the lower plate 36, and can indicate the magnitude of downtilt applied to the antenna 10. As a result, a technician can easily adjust the antenna 10 to a desired degree of downtilt by tracking the markings 132 as the projection 40 is rotated.

In addition, the vertical offset of the wiper members 70, 72 can enable the antenna 20 to have a smaller diameter. The components of the PCB 48 that participate in the transmission and reception of RF signals in the S-band may include traces 54 that are relatively lengthy and, therefore, occupy considerable space. Thus, for an antenna with a relatively small diameter, the reflector panels 42 and the PCBs 48 mounted therein may need to be relatively narrow (from side-to-side) to fit within the desired diameter. Consequently, there is limited space on the PCBs 48 in which to fit other components, such as the wiper arms 70, 72. By mounting the wiper arms 70, 72 of the S-band at different elevations on the PCB 48 (i.e., they are vertically offset from each other along the axis on which the phase shifter linkage 100 travels), the wiper arms 70, 72 can fit on the PCB 48. However, even though the wiper arms 70, 72 are vertically offset from each other, they are still moved together via the common S-band carrier member 104, such that the downtilt induced on antenna beams produced by the radiating elements 52 by the wiper arms 70, 72 is the same for both wiper arms 70, 72.

The antenna 20 may have an overall height of between about 1100 and 1200 mm (e.g., 1158 mm) and a diameter of between about 280 and 330 mm (e.g., 305 mm).

Those of skill in this art will appreciate that the antenna 20 may take other forms. For example, the antenna 20 may be taller, shorter, wider, and/or narrower than shown and described. A different drive linkage to move the V-band carrier member 106 and the S-band carrier member 104 may be employed. Either or both of the V-band carrier member 106 and the S-band carrier member 104 may take a different configuration, or may engage the wiper members 60, 62, 70, 72 in a different manner. In some embodiments, different numbers of reflector panels 42 and PCBs 48 may be employed, in which case the numbers of wiper members and arms on the carrier members 104, 106 may also vary accordingly. In some embodiments, the projection 40 may be connected with a motor or other drive device that can be accessed remotely, thereby enabling downtilt to be adjusted remotely. Other variations may be apparent to those of skill in this art.

Exemplary embodiments according to the present disclosure have been described above with reference to the attached drawings. However, those of ordinary skill in the art should understand that various changes and modifications can be made to the exemplary embodiments of the present disclosure without departing from the gist and scope of the present disclosure. All changes and modifications are included in the protection scope of the present disclosure defined by the claims. The present disclosure is defined by the attached claims, and equivalents of these claims are also included.

That which is claimed is:

1. A base station antenna, comprising:

a plurality of reflector panels;

a plurality of printed circuit boards (PCBs), each of the circuit boards mounted on a respective one of the reflector panels;

a plurality of radiating elements mounted on each of the PCBs, wherein the PCBs and the radiating elements are configured and arranged so that the base station antenna receives and transmits radio frequency signals in a first frequency band and a second frequency band;

first and second wiper members pivotally mounted on each PCB at respective first and second pivots, the first and second wiper members being configured such that pivotal movement of the first and second wiper members induce downtilt angle adjustment in the radiating elements that transmit and receive signals in the first frequency band;

third and fourth wiper members pivotally mounted on each PCB at respective third and fourth pivots, the third and fourth wiper members being configured such that pivotal movement of the third and fourth wiper members induce downtilt angle adjustment in the radiating elements that transmit and receive signals in the second frequency band; and a phase shifter linkage comprising a first carrier member and a second carrier member fixed relative to the first carrier member, the first carrier member engaging the first and second wiper members and the second carrier member engaging the third and fourth wiper members;

wherein actuation of the phase shifter linkage causes the first carrier member and the second carrier member to move in concert relative to the PCBs, so that downtilt angle adjustment of the first frequency band equals downtilt adjustment of the second frequency band.

2. The base station antenna defined in claim 1, wherein the phase shifter linkage is configured to move the first and second carrier members along an axis, wherein the first and second pivots are not axially offset from each other, and wherein the third and fourth pivots are axially offset from each other.

3. The base station antenna defined in claim 1, wherein the first frequency band is the V-frequency band and the second frequency band is the S frequency band.

4. The base station antenna defined in claim 1, wherein the plurality of reflector panels comprises four reflector panels.

5. The base station antenna defined in claim 4, wherein the reflector panels define an enclosure having a generally square cross-section, and wherein the first and second carrier members reside in the enclosure.

6. The base station antenna defined in claim 1, further comprising a lower plate, wherein the phase shifter linkage further comprises a projection that projects from the lower plate, and wherein rotation of the projection drives the phase shifter linkage.

7. The base station antenna defined in claim 1, further comprising a cylindrical housing, wherein the reflector panels, the PCBs, and the phase shifter linkage reside within the housing, and wherein the housing has a diameter of between about 280 and 330 mm.

8. A base station antenna, comprising:

a plurality of reflector panels;

a plurality of printed circuit boards (PCBs), each of the circuit boards mounted on a respective one of the reflector panels;

a plurality of radiating elements mounted on each of the PCBs, wherein the PCBs and the radiating elements are configured and arranged so that the base station antenna receives and transmits radio frequency signals in a first frequency band and a second frequency band;

first and second wiper members pivotally mounted on each PCB at respective first and second pivots, the first and second wiper members being configured such that pivotal movement of the first and second wiper members induce downtilt angle adjustment in antenna beams produced by the radiating elements that transmit and receive signals in a first frequency band;

third and fourth wiper members pivotally mounted on each PCB at respective third and fourth pivots, the third and fourth wiper members being configured such that pivotal movement of the third and fourth wiper members induces downtilt angle adjustment in antenna beams produced by the radiating elements that transmit and receive signals in a second frequency band; and a phase shifter linkage comprising a first carrier member and a second carrier, the first carrier member engaging the first and second wiper members and the second carrier member engaging the third and fourth wiper members, the phase shifter linkage configured to move the first and second carrier members along an axis;

wherein the first and second pivots are not axially offset from each other, and wherein the third and fourth pivots are axially offset from each other.

9. The base station antenna defined in claim 8, wherein the first frequency band is the V-frequency band and the second frequency band is the S frequency band.

10. The base station antenna defined in claim 8, wherein the plurality of reflector panels comprises four reflector panels.

11. The base station antenna defined in claim 10, wherein the reflector panels define an enclosure having a generally square cross-section, and wherein the first and second carrier members reside in the enclosure.

12. The base station antenna defined in claim 8, further comprising a lower plate, wherein the phase shifter linkage further comprises a projection that projects from the lower plate, and wherein rotation of the projection drives the phase shifter linkage.

13. The base station antenna defined in claim 8, further comprising a cylindrical housing, wherein the reflector panels, the PCBs, and the phase shifter linkage reside within the housing, and wherein the housing has a diameter of between about 280 and 330 mm.

14. A base station antenna, comprising:

four reflector panels;

four printed circuit boards (PCBs), each of the circuit boards mounted on a respective one of the reflector panels;

a plurality of radiating elements mounted on each of the PCBs, wherein the PCBs and the radiating elements are configured and arranged so that the base station antenna receives and transmits radio frequency signals in a first frequency band and a second frequency band;

first and second wiper members pivotally mounted on each PCB at respective first and second pivots, the first and second wiper members being configured such that pivotal movement of the first and second wiper members induce downtilt angle adjustment in antenna beams produced by the radiating elements that transmit and receive signals in first frequency band, the first frequency band being the S-frequency band;

third and fourth wiper members pivotally mounted on each PCB at respective third and fourth pivots, the third and fourth wiper members being configured such that pivotal movement of the third and fourth wiper members induce downtilt angle adjustment in antenna beams produced by the radiating elements that transmit and receive signals in a second frequency band, the second frequency band being the V-frequency band; and a phase shifter linkage comprising a first carrier member and a second carrier member fixed relative to the first carrier member, the first carrier member engaging the first and second wiper members and the second carrier member engaging the third and fourth wiper members;

wherein actuation of the phase shifter linkage causes the first carrier member and the second carrier member to move in concert relative to the PCBs, so that downtilt angle adjustment of the first frequency band equals downtilt adjustment of the second frequency band.

15. The base station antenna defined in claim 14, wherein the phase shifter linkage is configured to move the first and second carrier members along an axis, wherein the first and second pivots are not axially offset from each other, and wherein the third and fourth pivots are axially offset from each other.

16. The base station antenna defined in claim 14, wherein the reflector panels define an enclosure having a generally square cross-section, and wherein the first and second carrier members reside in the enclosure.

17. The base station antenna defined in claim 14, further comprising a lower plate, wherein the phase shifter linkage further comprises a projection that projects from the lower plate, and wherein rotation of the projection drives the phase shifter linkage.

18. The base station antenna defined in claim 14, further comprising a cylindrical housing, wherein the reflector panels, the PCBs, and the phase shifter linkage reside within the housing, and wherein the housing has a diameter of between about 280 and 330 mm.

* * * * *